Jan. 25, 1927. 1,615,553
T. E. PETERSEN ET AL
INDICATING SPEEDOMETER FOR AUTOMOBILES AND THE LIKE
Filed July 3, 1923 3 Sheets-Sheet 1

Inventors
T. E. Petersen
J. Rasmussen
E. Rasmussen
By Marks & Clerk Attys.

Jan. 25, 1927.

T. E. PETERSEN ET AL 1,615,553

INDICATING SPEEDOMETER FOR AUTOMOBILES AND THE LIKE

Filed July 3, 1923   3 Sheets-Sheet 2

Inventors
T. E. Petersen
J. Rasmussen
E. Rasmussen
By Marks & Clerk
attys.

Jan. 25, 1927.  1,615,553
T. E. PETERSEN ET AL
INDICATING SPEEDOMETER FOR AUTOMOBILES AND THE LIKE
Filed July 3, 1923   3 Sheets-Sheet 3

Inventors
T. E. Petersen
J. Rasmussen
E. Rasmussen
By Marks & Clerk Attys.

Patented Jan. 25, 1927.

1,615,553

UNITED STATES PATENT OFFICE.

THOR EJNAR PETERSEN, JØRGEN RASMUSSEN, AND EIGIL RASMUSSEN, OF COPENHAGEN, DENMARK.

INDICATING SPEEDOMETER FOR AUTOMOBILES AND THE LIKE.

Application filed July 3, 1923, Serial No. 649,383, and in Denmark January 12, 1923.

The present invention relates to an indicating speedometer for automobiles and the like, and the distinguishing feature of the indicating operation of the speedometer is that the automatic indication of the speed of travel is made only when the speed of travel suddenly, or at any rate very quickly, varies from a high to a very low speed, as the case will be, when the automobile is braked for some reason or other, for instance an accident.

The indicating process here referred to has thus the advantage that no indication is made of the speed during normal travel but, on the other hand, an indication is made of the speed of travel at the moment, when the motor vehicle is braked in consequence of an accident or some other cause, and it may in such cases be an advantage to the driver of the vehicle to be able to prove, by means of the indicating speedometer, that the speed has not exceeded the permissible limit.

By the present invention it will also become practicable to ascertain accurately the distance covered from the moment when the brakes were applied to the stand-still of the motor vehicle.

The indicating device proper and the speedometer co-operating with the same may be constructed in various manners without deviation from the principle underlying the invention, and the construction described below is therefore only a special embodiment. The drawings show the features necessary to understand the invention.

Figure 1:
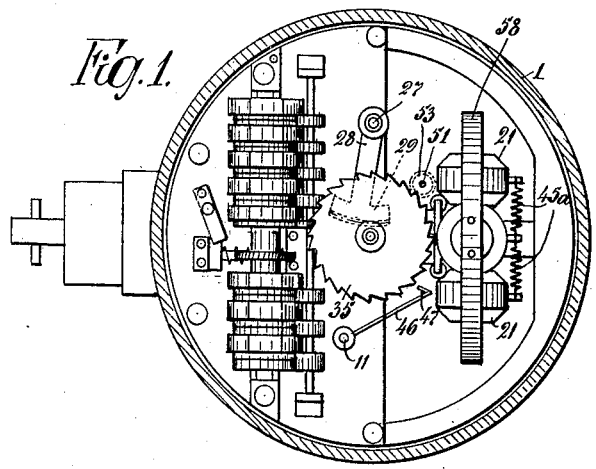
Figure 3:
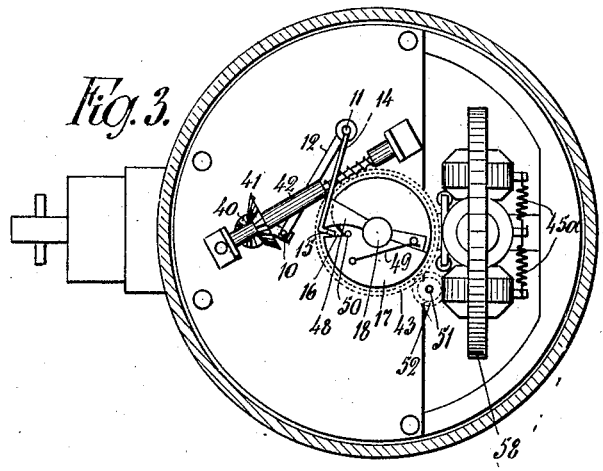
Figure 2:
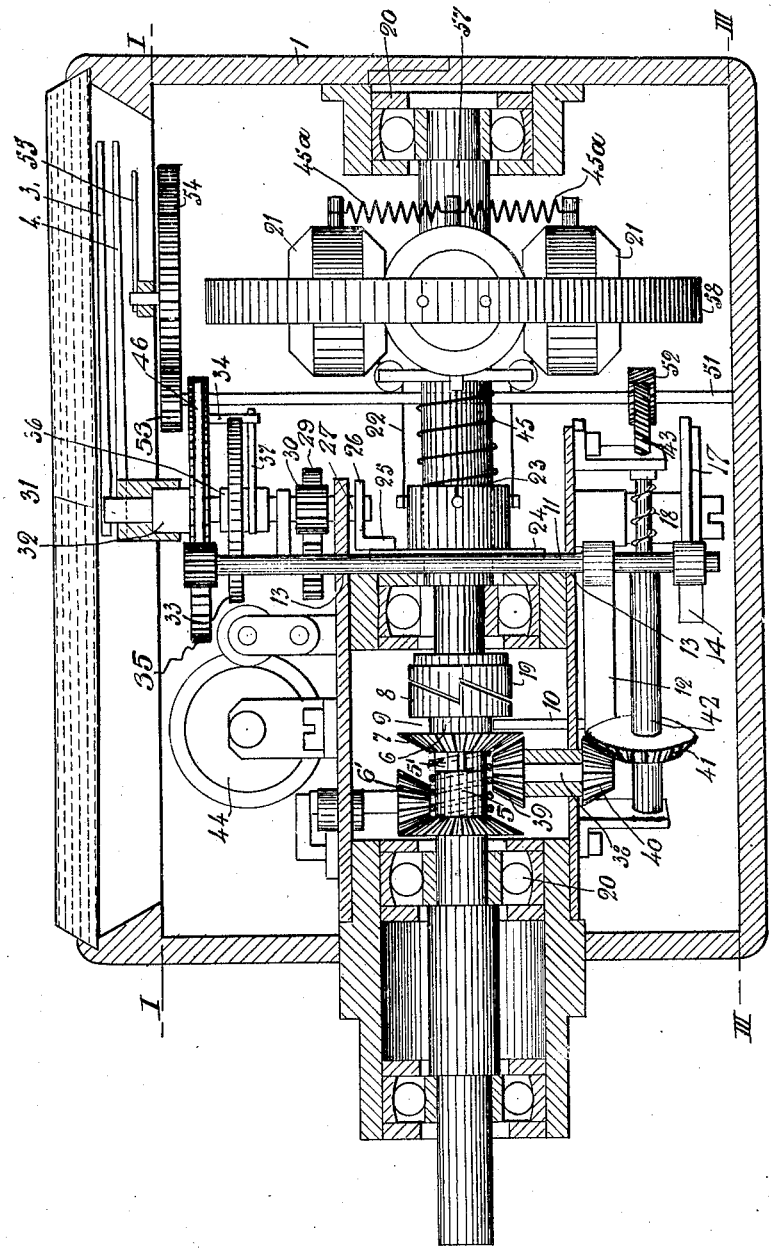
Figure 4:
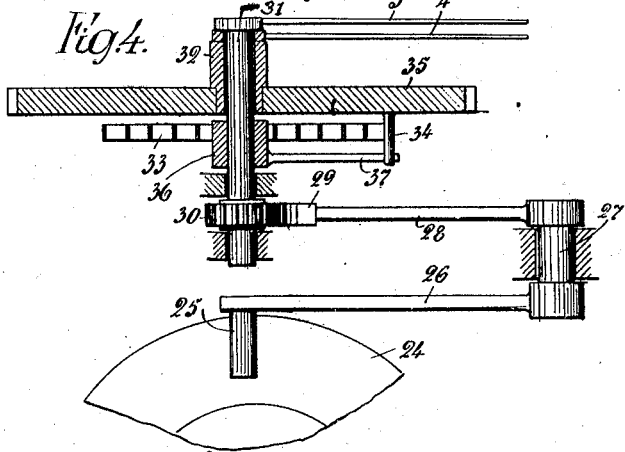
Figure 5:
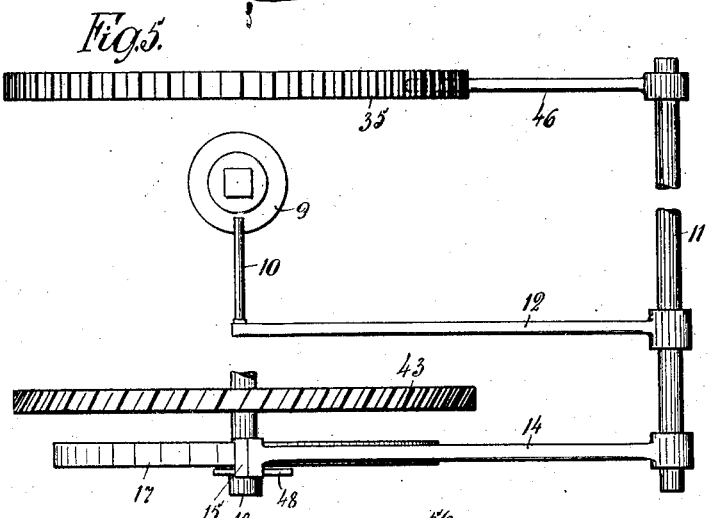
Figure 6:
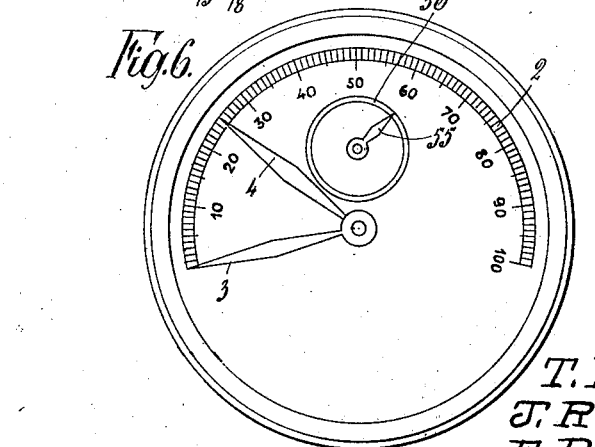

Fig. 1 shows in front view a cross-section of the speedometer along the line I—I of Fig. 2, Fig. 2 is a longitudinal section of the speedometer, seen from the right, Fig. 3 is a cross-section along the line III—III of Fig. 2 and seen from the rear, Fig. 4 shows, to a larger scale, a detail of the moving mechanism of the indicator hands, Fig. 5 shows a detail of the release mechanism of the indicating hand 4 (Fig. 6), on a similarly enlarged scale, Fig. 6 shows, in front view, the dial of the speedometer.

The casing 1 of the speedometer is cylindrical with plane rear wall (at the bottom of Fig. 2) and with an equally plane front wall (at the top of Fig. 2) on the outer face of which a curved scale 2 (Fig. 6) is provided, on which the momentary speed of travel indicated by the hand 3 may be read. The above mentioned speed of travel, immediately before the motor vehicle is braked, may be read by means of a hand 4, and the distinguishing feature of the indicating speedometer here referred to is that the indicating hand 4 swings back and forth following the hand 3 during normal travel, while the hand 4, when the vehicle is braked, remains stationary and, consequently allows the hand 3 to return alone, until it shows for instance the speed zero.

The arangement, however, is such that the indicating hand 4, when the vehicle is started once more, and has covered a certain distance, for instance 50 meters, will commence again to follow the indicator hand 3.

During the travel the shaft 5 rotates, and this shaft is connected, by means of a square head milled on its front end, or in other suitable manner, to a sleeve 6, which is adapted to slide on the square milled shaft, and supports at one end a bevel gear wheel 7, while its other end forms a clutch-coupling 8. The sleeve 6 is pressed forward, Fig. 2, by means of a spring 6'. Between the gear wheel 7 and the coupling 8 there is provided, on the sleeve, an annular groove 9 which is engaged by a pin 10 at the end of an arm 12 provided on a shaft 11.

The shaft 11 is journalled in a couple of bearings 13 in the interior of the casing 1 and supports, besides the arm 12, another arm 14 provided with a hook 15 (Fig. 3) cooperating in the manner described below, with a disc 17 which is provided with a notch 16, and is pivoted about a pin 18 in the interior of the casing.

In line with the shaft 5 there is journalled a shaft 57 to the end of which facing the shaft 5 there is fixed a coupling-half 19, which normally engages the coupling-half 8.

The shaft 57, which is journalled in ball bearings 20 in the casing, is fitted with a centrifugal governor of known construction. From the swinging weights 21 of the latter, cords or chains 22 extend to a sleeve 23 adapted to slide on the shaft 57 and fitted with a flange 24 (Figs. 2 and 4), which co-operates with a pin 25 provided on an arm 26. The arm 26 is fixed on a short spindle 27 fitted with another arm 28, which supports a toothed sector 29 (Figs. 1 and 4) cooperating with a pinion 30 on the spindle 31 of the indicator hand 3. It will now be easy to understand that a displacement of the sleeve 23 produced by varying speeds will cause the hand 3 to move along the scale 2.

On the shaft 31 (Fig. 4) there is provided a loosely fitting sleeve 32 supporting a hand 4 and a ratchet wheel 35, from the side of which projects a pin 34 engaging an arm 37 on a sleeve 36 fixed on the shaft 31 inside of the loose sleeve 32. Furthermore the pin 34 on the ratchet wheel 35 and the fixed sleeve 36 are interconnected by means of a spiral spring 33.

Behind the gear wheel 7 (Fig. 2), but normally without connection with the latter, there is provided on a shaft 38 a bevel gear wheel 39, and at the other end of the shaft there is provided another bevel gear wheel 40, which engages a gear wheel 41 on a worm shaft 42, which in its turn co-operates with a worm wheel 43 provided on the pin 18 and firmly connected to the disc 17 (Figs. 3 and 5).

Furthermore, the shaft 5 is connected to a counting mechanism 44, which is well known, and does not form any part of the present invention.

When the motor vehicle is running, the shaft 5 will rotate at a speed corresponding to the speed of the vehicle, and the said rotation will be transmitted by way of the clutch-coupling 8—19 and the shaft 57 to the centrifugal governor, which in known manner by means of the swinging weights 21 (Fig. 2) of the centrifugal governor actuates the sleeve 23, which will thereby be drawn forward a corresponding distance on the shaft 57 while overcoming the resistance of the spring 45.

The flange 24 (Figs. 2 and 4) of this sleeve by pressing against the pin 25 will turn the arm 26 and, thereby also the arm 28 the toothed sector 29 of which will turn the pinion 30, which is connected to the hand 3, in such a manner that the said hand in known manner will indicate the speed on the scale 2 (Fig. 6).

At the same time, however, the indicating hand 4 provided behind the hand 3 will be moved, as the arm 37 by means of the pin 34 will take along the ratchet wheel 35 with sleeve 32 and hand 4, and the two hands 3 and 4 will move together, the hand 4 continuing to be covered by the hand 3 (Fig. 4).

If now the motor vehicle is braked for some reason or other, then the coupling half 19, owing to the inertia of the centrifugal body 18 with its swinging weights 21, will continue to rotate, and will thereby push the coupling half 8 out of engagement (Fig. 2). By this displacement of the sleeve 6 supporting the coupling half 8, the annular groove 9 will turn the arm 12 and, thereby, the shaft 11, which then causes the hook 15 to be lifted out of engagement with the notch 16 (Fig. 3) in the disc 17, which thereby becomes free and now, at once commences to rotate, because the continued displacement of the sleeve 6 (Fig. 2) will set the gear wheel 7 into mesh with the gear wheel 39, whereby the motion is transmitted by means of the shaft 38 and the gear wheels 40 and 41 to the worm shaft 42.

At the beginning of the displacement of the sleeve 6 and simultaneously with the hook 15 being lifted out of engagement with the notch 16 in the disc 17, an arm 46 (Fig. 1) with check pawl 47 provided on the front end of the shaft 11 will be turned, and will thereby bring the pawl into engagement with the ratchet wheel 35 and, thereby, stop the latter instantaneously in the position it occupies at the moment it is released from the coupling 8—19 and, thereby, hold the indicating hand 4 in position, until the hook 47 again releases the wheel 35, whereafter the spiral spring 33 (Fig. 4) will return the wheel 35, until the pin 34 meets the arm 37, and the hand 4 will then again stand behind the hand 3.

This release of the wheel 35 is effected in the following manner:

A stop 48 (Fig. 3) is loosely mounted on the pin 18, and may cover the notch 16 in the disc 17 so as to prevent the hook 15 on the arm 14 from entering again into the notch 16, before the disc 17 has made one revolution.

This stop 48 is maintained in position by a small spring 49, which when the hook 15 is out of engagement with the notch 16 and the stop 48 will press the latter against a stopping pin 50 on the disc 17. When the disc 17 has made one revolution, then the hook 15 sliding along the edge of the disc will catch the stop 48 and prevent the latter from following the rotation of the disc, in such a manner that the notch 16 becomes uncovered and the hook 15 may again drop into the notch. Hereby the arm 46 provided on the same shaft as the hook 15 (the shaft 11, Figs. 1 and 5) will be turned, and will thereby lift the check pawl 47 out from engagement with the wheel 35.

As mentioned before, the distance travelled from the beginning of the braking to the complete stop may be measured and read by means of the instrument here described. This is effected by the following arrangement.

On a shaft 51 journalled in the casing 1 (Fig. 2) there is provided a pinion 52 in engagement with the worm wheel 53 and, at the other end of the shaft, a pinion 53 engaging a gear wheel 54, which supports an indicator hand 55 moving along a scale 56 on the face of the instrument.

When a sudden braking action causes the worm shaft 42 to move, then the worm wheel 43 will turn the gear wheel 52 and, thereby, the shaft 51, the gears 53 and 54 and the hand 55, which indicates on the scale the distance travelled in meters.

Having now particularly described and ascertained the nature of our said invention and in what manner the same is to be performed, we declare that what we claim is:

1. An indicating speedometer for motor vehicles including in combination a rotatable shaft, speed responsive mechanism for actuating the shaft, a speed indicating pointer carried by the shaft, a maximum speed indicating pointer loosely mounted on the shaft, means between the shaft and the loosely mounted pointer for causing the latter pointer to move forwardly and rearwardly with the speed indicating pointer, and mechanism actuated by the speed responsive actuating mechanism when the vehicle is braked for holding the loose pointer in the position indicative of the maximum speed of the vehicle.

2. An indicating speedometer for motor vehicles including in combination a rotatable shaft, speed responsive mechanism for actuating the shaft, a speed indicating pointer carried by the shaft, a maximum speed indicating pointer loosely mounted on the shaft, means between the shaft and the maximum speed indicating pointer to cause the latter pointer to move forwardly and rearwardly with the speed indicating pointer, mechanism actuated by the speed responsive actuating mechanism when the vehicle is braked for holding the maximum speed indicating pointer in a set position, means actuated by a portion of the mechanism for holding the maximum speed indicating pointer upon the continued actuation of said speed responsive mechanism for releasing the maximum speed indicating pointer, and means for returning the maximum speed indicating pointer to its normal position.

3. An indicating speedometer for motor vehicles as claimed in claim 1, wherein means is provided for releasing the loosely mounted pointer, and means for returning said pointer to its normal position.

4. An indicating speedometer as claimed in claim 1, wherein the speed responsive mechanism for actuating the rotatable shaft includes rotatable aligning shafts, a clutch interposed therebetween, a centrifugal governor mounted on the driven shaft and including a flanged sleeve, a rock shaft, spaced arms on the rock shaft, one of which is engaged with the flange sleeve, a segmental gear on the other arm, and a gear on the rotatable pointer carrying shaft engaged by the segmental gear.

5. An indicating speedometer for motor vehicles as claimed in claim 1, wherein the means for mounting and controlling the movement of the loosely mounted pointer includes a sleeve loosely mounted on the rotatable shaft and to which said pointer is connected, a ratchet wheel carried with the sleeve, an arm depending from the ratchet wheel, another sleeve fixed to the rotatable shaft, an arm extending from the fixed sleeve for engaging the arm on the ratchet wheel to effect rotation of the latter, a spring mounted above the rotatable shaft and connected thereto and also connected with the arm on the ratchet wheel and adapted to be wound when the ratchet wheel and pointer are held and also adapted to move the movable pointer from its original position when the ratchet wheel is released.

6. An indicating speedometer for motor vehicles as claimed in claim 1, wherein the speed responsive mechanism actuated with the rotatable shaft includes a movable clutch member while the mechanism for holding the loosely mounted pointer includes a ratchet wheel loosely mounted with the pointer, a rock shaft, operable connections between the movable clutch member and the rock shaft, a pawl on the rock shaft for engaging the ratchet wheel, means for latching the rock shaft in an adjusting position, and gearing between the movable clutch member and the latching means of the rock shaft and operated simultaneously with the braking of the vehicle for releasing the latching means to cause the locking of the shaft and the release of the latching means.

In testimony whereof we affix our signatures.

THOR EJNAR PETERSEN.
JØRGEN RASMUSSEN.
EIGIL RASMUSSEN.